United States Patent Office 3,387,373
Patented June 11, 1968

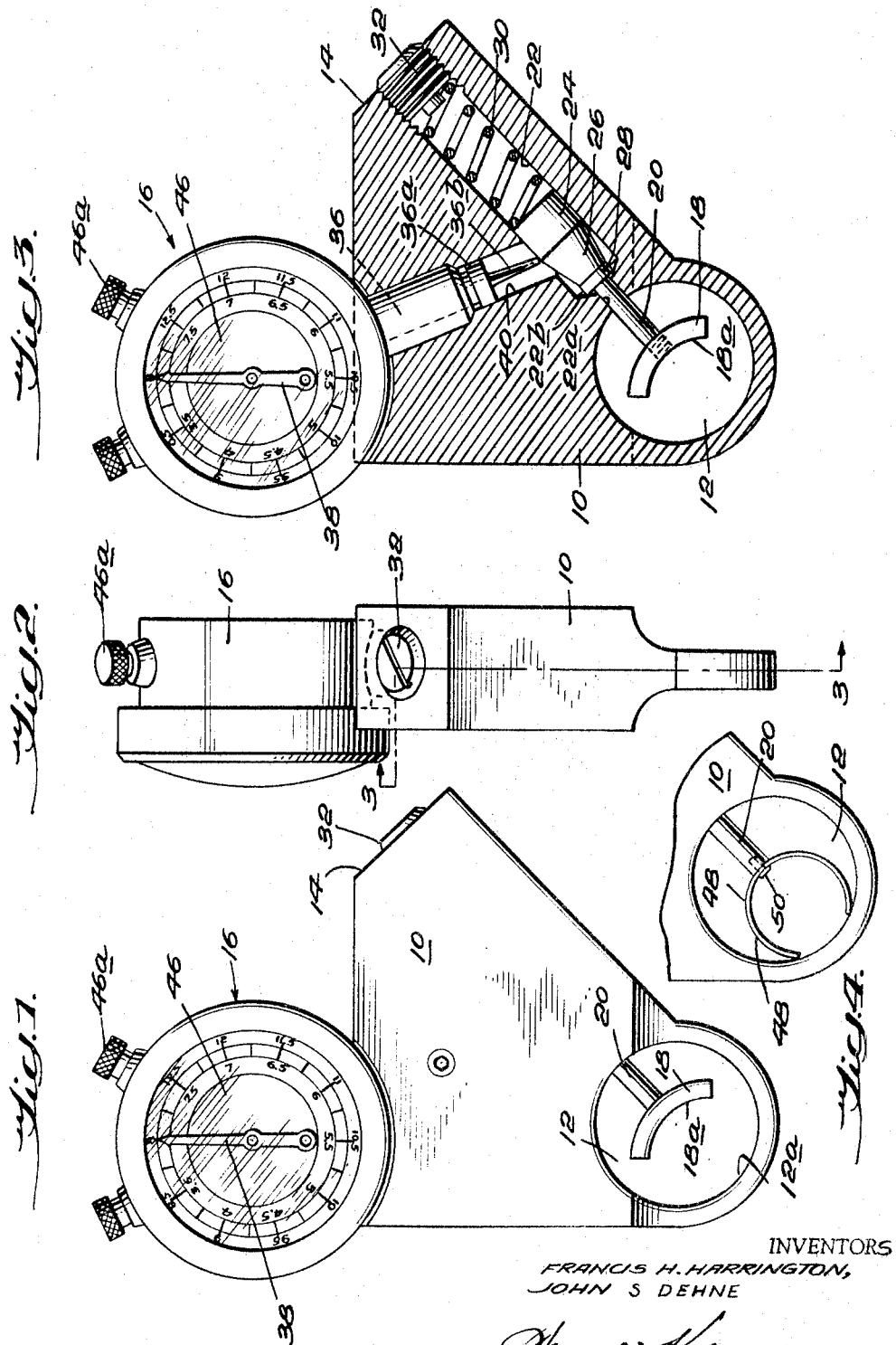

3,387,373
FINGER RING GAUGES
Francis H. Harrington, Hampton, N.H., and John S. Dehne, Boston, Mass., assignors to Dieges & Clust, Providence, R.I., a corporation of New York
Filed Apr. 12, 1967, Ser. No. 630,417
5 Claims. (Cl. 33—147)

ABSTRACT OF THE DISCLOSURE

A dial-type finger ring gauge comprising a body member having a finger-receiving hole extending therethrough, an edge portion of which provides a fixed contact surface, a movable contact operative in said hole and having a contact surface opposed to said fixed contact surface, an indicating dial mounted on said body member in a readily viewable position thereon, and means carried by said body member for translating motion of said movable contact in accordance with variations in finger size and profile into motion of the pointer of said dial thereby to provide a visual indication of finger-ring size and profile.

This invention relates to improvements in gauges for determining proper finger-ring size, and more particularly to an improved finger-ring gauge capable of giving a visual indication of finger size and contour, by which custom-fitting of rings to actual finger size and contour may be simply and quickly achieved.

As conducive to a proper understanding of the advantages of a finger-ring gauge of the invention, which for convenience will be hereinafter referred to as a dial-type ring gauge, it is explained that standard ring sizes are in multiples of one-half size which increase in increments of .016" plus or minus, and that ring sizes which run from 3–8 in women's sizes and from 8–13 in men's sizes, are customarily determined by the use of approximately 20–25 individual round gauge rings which are calibrated to one-half ring sizes as aforesaid.

Since determination of the particular size of ring suited for any particular finger being fitted for a ring is largely a matter of decision of the person sizing the finger, with interpretation as to proper ring size varying from individual to individual doing the measuring, errors in sizing arising from poor judgment on the part of said person are not uncommon. Inaccurate sizing procedures and the tolerances from the .016" variation from ring gauge to ring gauge present in standard round gauge-rings create further errors. Again, when measuring for group orders, i.e. when measuring the finger size of groups of students for class or school rings, for example, visual sizing plus limited gauge selection is often of necessity relied upon, and such constitutes another cause of improper sizing.

Yet another more subtle cause of improper ring sizing or fitting arises from the fact that whereas standard gauge rings are uniformly circular, the majority of fingers, by virtue of knuckle formation and/or configuration, have greater width than height, thus having approximately oval rather than circular shape. While the more expensive rings usually are made oval rather than circular, thus in large measure accommodating for the oval configuration of the finger to which they are fitted, such is not true of the less expensive rings which are made up in full circular sizes, so that the danger of improper fitting of the inexpensive rings is greater than that of the more expensive rings. Accordingly, it is common-place for the ring manufacturer, after filling group orders of the less expensive circular rings, being required to re-size a substantial percentage of the rings which were improperly fitted because of oval finger configuration in the first place.

Generally stated, the object of the present invention is the provision of a finger-ring gauge which, by its ability to measure accurately all sizes and contours of fingers within the normal range of finger sizes, is capable of replacing the approximately 20–25 individual gauge rings previously required in fitting finger rings to individual fingers.

More particularly, an object of the invention is the provision of a finger-ring gauge which, by its ability to give a running or continuing indication of both size and profile of a finger being measured for a ring, provides an effective means for custom-fitting rings to individual fingers.

A further object of the invention is the provision of a dial-type finger-ring gauge which is capable of giving a visual indication of the actual size and contour of any particular finger being fitted, and which thereby eliminates errors in judgment and/or procedure in fitting rings which were previously commonplace, particularly in sizing fingers for group orders.

A still further object of the invention is the provision of a dial-type finger-ring gauge characterized by its ability to give a speedy as well as an accurate determination of ring size and which at the same time is relatively simple in construction, thoroughly dependable in use, and not likely to get out of order or to require repair or replacement of parts.

The above and other objects and advantages of a finger-ring gauge according to the present invention will become clear from the following detailed description, in which reference is had to the accompanying drawings illustrating preferred embodiments of such a ring gauge, wherein FIG. 1 is a front elevation of a finger-ring gauge according to the invention, as it is viewed by the person sizing a finger to be fitted for a ring;

FIG. 2 is a side elevation thereof;

FIG. 3 is a section taken generally along line 3—3 of FIG. 2; and

FIG. 4 is a broken-away front elevation which illustrates a variant form of movable finger contact from that shown in FIGS. 1 and 3.

Referring to the drawings, wherein like reference numerals designate like parts throughout the several views, reference numeral 10 generally designates the body member of a finger-sizing gauge as herein proposed, which illustratively takes the form of a roughly right-triangularly shaped block turned so that its base side is vertical and its altitude side is horizontal. The one apical portion of said block which is disposed downwardly, rather than being shaped to angular formation, is instead rounded and is provided with a front-to-rear through hole designated 12, of a diameter substantially larger than any fingers to be fitted for a ring, but into which said fingers are inserted during sizing thereof, all as will be hereinafter explained. The opposite apical portion of the body block is also modified from angular formation, being cut away so as to form a flat surface designated 14, whose purpose will later become evident. According to the invention, said body block 10 mounts a dial-type indicator 16, in position such that it projects upwardly therefrom and is disposed above and generally in line with the aforesaid hole 12 provided in the lower apical portion of said block.

While the dimensions of said body block 10 may vary within limits, it is built to a size such that it can comfortably be held in the hand of a person called upon to determine the size of a ring which will accurately fit a particular finger inserted into the hole 12. Thus, in an actual ring gauge constructed according to the principles of the invention and which is giving excellent results in actual use, the overall height of the body block 10 (of course excluding the height of the dial indicator 16) is 2⅝" and its maximum width dimension is only slightly greater.

A ring gauge as herein contemplated is broadly of the opposed contact type, wherein one contact is fixed and the other is movable in accordance with variation in size of the finger being sized. More particularly, the fixed and movable contacts of the subject gauge are provided, respectively, by the approximate 90° arcuate portion 12a of the circular edge of the hole 12 through the block 10 which faces upwardly-rightwardly, i.e. in the direction of the flat surface 14, and by the opposed arcuate surface 18a of a movable finger contact 18 operative within said hole 12.

Said movable finger contact 18, which in the FIG. 3 form gauge is in the nature of a rigid arcuate shoe, is fixedly mounted on the lower, small-diameter end of a nonrotary spindle 20 which projects into the hole 12 and is axially movable within the lower end portion of a bore 22 formed in the block 10 which extends fully between the flat surface portion 14 thereof and the aforesaid hole 12. At its uppermost end, the spindle 20 is formed with a large-diameter cylindrical bearing portion 24 having sliding bearing on the cylindrical wall of the bore proper, and in its intermediate portion with a translating taper designated 26, whose upper larger-diameter end connects to and has diameter equaling that of said bearing portion 24 and whose smaller-diameter end connects to a stop-collar portion 28 to which said smaller-diameter spindle end connects.

By reference to FIG. 3, it will be noted that said stop-collar portion 28 has somewhat larger diameter than the lower constricted-diameter end 22a of the aforesaid bore which is separated from the bore proper by a step or shoulder 22b. Thus, engagement of said stop collar portion against the shoulder 22b determines the lowermost position of the spindle and correspondingly the innermost position of the movable finger contact 18 carried thereby; and it further establishes minimum spacing between said movable finger contact and the opposing arcuate portion 12a of the edge of the hole 12 which defines the fixed contact.

FIG. 3 shows that the spindle 20, and thereby the movable finger contact 18, are spring-urged to their respective innermost positions as aforesaid by means of a biasing spring 30 disposed within the bore 22 so as to be reactive against the relatively upper end of the large-diameter bearing portion 24 of the spindle and a set screw 32 which is threaded into a correspondingly threaded counter-bore 34 provided at the upper end of the spindle bore 22 for the reception thereof. Such arrangement provides a simple means of adjusting the bias which the spring 30 imparts to the finger contact 18 to that required to permit free yet controlled movement of the latter in accordance with the size and contour or profile of a finger to be sized as the latter is moved axially through the finger opening defined by the fixed contact, i.e. the arcuate portion 12a of the finger hole 12, and the opposed arcuate surface 18a of the movable finger contact 18. Stated otherwise, the biasing spring 30 insures movement of the movable finger contact 18 in accordance with variations in both the size and contour or profile of a finger inserted into and moving axially through the hole 12 in the body block 10.

The aforesaid indicator-dial 16 is of the type well known in the art, being manufactured by The Starret Company, of Athol, Mass., and hence no detailed description thereof is here given. However, for the purpose of the present invention, its axially movable stem 36 which, by reference to FIG. 3, always makes direct engagement with the translating taper 26 of the spindle 20, thus to convert or translate axial movement of said spindle into angular motion of the indicator pointer or needle 38, is specially formed. That is to say, the lower end of said stem 36 is formed with a bearing portion 36a having sliding bearing on the cylindrical wall of a bore 40 provided in the body block 10 to receive said stem and which intersects the aforesaid bore 22 at an angle of approximately 75° to the axis of the latter, and with a depending substantially smaller-diameter tip portion 36b which terminates in a rounded point. It will be understood that by design the rounded point of the tip 36b of the stem 36 bears on the translating taper portion 26 of the spindle 20, due to a downward bias exerted on said stem by a spring associated therewith (not shown).

Illustratively, the face 46 of the dial 16 is calibrated in increments of ring sizes, beginning with size 3 (which in the hundredths of an inch scale corresponds to .554"± diameter) and running to approximately size 13 (corresponding to .874"± diameter), thus covering the full range of both men's (and boys') and women's (and girls') ring sizes. By proper choice of the taper of the taper portion 26 of the spindle, the pointer 38 can be made to make two full revolutions, one such revolution as the movable contact 18 moves throughout the range of women's (girls') ring sizes 3–8, and the second as said movable contact moves throughout the range of men's (boys') ring sizes 8–13. To take advantage of this feature, the dial face 46 of the dial is shown to be inscribed with inner and outer 360° scales, the inner scale being calibrated in equal increments of the women's ring sizes 3–8 inclusive, and the outer scale being calibrated in equal increments of the men's ring sizes 8–13 inclusive. Thus, a gauge according to the invention not only enables accurate ring sizes to be read directly from the dial, a feature which is of great advantage since such eliminates human errors in interpreting ring size arising through the improper use of a plurality of individual gauge rings and/or in following inaccurate gauging procedures, but also it enables both men's and women's ring sizes to be determined by one and the same gauge, and without the requirement of a large bulky dial.

Of course, the ability to read correct ring sizes directly from the dial face 46, as reflected by angular position of the pointer 38 moving around same, depends on proper calibration of the size scales, but such may readily be effected, and thereafter checked as may be necessary, by the insertion of a size 3 standard male ring gauge into the hole 12 and adjusting the angular position of the dial face 46 so that it will read "3" when the pointer is at the "0" marking on the scale and then inserting larger-size male ring gauges into said hole 12 and checking the pointer positions in relation to size markings against size numbers of those particular male gauges employed in the calibration check. To provide for angular adjustment of the dial face 46, should such be necessary, the casing of the dial mounts an adjusting screw 46a which is drivingly connected to the dial face (by means not here illustrated since such is conventional) so that manual turning thereof will effect proportional turning of said dial face.

Referring to FIG. 4, such illustrates that the movable finger contact 18 may take forms other than that of the rigid arcuate shoe shown in the FIGS. 1 and 3. More particularly, a variant movable finger contact designated 48 according to FIG. 4 comprises an elongate strip or band of flexible spring metal which is connected at its mid-point as by a rivet or the like 50 to the lower end of the axially movable spindle 20 and has its ends curled inwardly towards one another and further has bearing on the aforesaid arcuate contact portion 12a of the finger-receiving hole 12. By such arrangement, the flexible band 48 maintains substantial circularity as the spindle moves axially within the bore 22 in accordance with variation in size and/or contour of fingers being gauged for rings.

Inasmuch as the gauge of the invention is adapted to be held in one hand of the person making one or more finger-size measurements and as its use requires the insertion of each finger to be sized for diameter and/or contour into the hole 12 or, more properly, into the space between the arcuate edge portion 12a of said hole and the opposite arcuate surface of the movable contact members 12 or 48, it is desirable that all edges of the body-member block 10, of the hole 12, and of the movable contact 12 (or 48) which are likely to touch the skin of either said person or the person whose finger is being sized or fitted for a ring be rounded, thus to prevent their hands or finger being scraped or cut. Furthermore, to reduce to a practical minimum the surface of the block which is engaged by the fingers being gauged, the thickness of the block in the general apical area thereof in which the finger-receiving hole 12 is formed is greatly reduced (as is best seen in FIG. 2), being only about one-third the thickness of the block proper.

The manner of use and the operation of dial-type finger-size measuring devices or gauges as described may be summarized as follows: The person performing the gauging holds the gauge in one hand, usually the left hand, turned so that the dial face 46 is clearly visible to him. Thereupon, the person to be fitted for a ring inserts his or her ring finger into the finger-receiving hole 12, which of course results in the movable finger contact 18 first engaging the finger and then moving outwardly or away from the fixed contact provided by the arcuate edge portion 12a of said finger-receiving hole in accordance with variations in size and/or contour of the finger. Since such outward movement of the movable finger contact is in effect indicated on the face of the dial 16 in terms of ring size, a direct reading of the size of the ring best suited to the finger being gauged is made possible. It will be appreciated that an important advantage provided by a gauge of the invention, and which stems from the fact that the bias which the spring 30 exerts on the spindle 20 is always in relatively inward direction, is that the movable contact 18 "floats" in accordance with variation in finger size and contour; that is to say, it is never static for the very reason that finger diameter and/or contour is never the same for all depths of finger insertion in said hole 12. Thus, the gauge of the invention gives to the person taking or performing the measurement a running indication of finger diameter and profile, the latter including changes in diameter, knuckle size, etc., as the finger is progressively inserted into the hole 12 and by slightly turning the finger relatively to the gauge or the gauge relative to the finger, the contour of the finger at any particular point along its length can also be visually determined. Thus, the present gauge makes possible the custom fitting of a ring to any size of finger submitted for gauging which while possible heretofore could be achieved only through the use of standard oval gauges used previously in fitting rings of the expensive type.

It will be appreciated that the illustrated means for translating axial motion of the spindle 20 into pointer movement responsive to variations in the size and profile of fingers being measured for ring size is typical only of numerous other means known in the art for translating reciprocatory into rotary motion which could be employed in a ring gauge as herein proposed in place of the particular translating means shown. It will be further understood that the body of the gauge, herein designated 10, may have size and shape other than that shown, since the invention is not limited to such details.

It is intended that all matter contained in the above description or shown in the accompanying drawing shall be interpreted as illustrative and not in a limiting sense.

We claim:

1. A dial-type finger ring gauge comprising a body member in the form of a generally right-triangular shaped block turned so that its base side is vertically disposed and its altitude side is horizontally disposed and being of a size to be comfortably held in the hand, said block being provided on its lower apical portion with a through hole for the insertion of a finger whose ring size and profile is to be gauged and with a communicating bore extending longitudinally therefrom along its hypotenuse side, a spring-loaded spindle axially movable in the bore and having its lower end projecting into the hole, a movable contact member mounted on the projecting end of the spindle and having an arcuate contact surface opposing that of the arcuate edge portion of the hole which it faces, a dial mounted on said block so as to project upwardly therefrom in general vertical alignment with said hole and including a pointer mounted for angular motion and a dial face inscribed with at least one scale calibrated in terms of ring size and means enclosed within said block for translating axial movement of the spindle in accordance with variations in size and profile of said finger into angular motion of the dial pointer.

2. A gauge according to claim 1, wherein said last means includes a translating taper on a length portion of the spindle disposed within the first-named bore and a spring-biased stem extending from the dial through a second bore provided in said block and which opens into said first-named bore and is inclined thereto, said stem terminating in a tip which bears on said translating taper.

3. A dial-type gauge according to claim 1, wherein said movable contact member comprises a rigid shoe-like member which is affixed intermediate its ends to the projecting lower end of the spindle.

4. A dial-type gauge according to claim 1, wherein said movable contact member comprises a strip of flexible material secured at its mid point to the projecting end of the spindle and whose opposite ends are curled towards one another and bear against arcuate edge portions of the hole thereby to define a substantially circular opening in all positions of the spindle.

5. A dial-type gauge comprising a body member and an indicating dial mounted on said body member and projecting therefrom to a readily viewable position, said body member having a generally circular finger-receiving hole extending through same, an arcuate edge portion of said hole providing a fixed contact, a spring-loaded spindle enclosed within said body member and having an end projecting into said hole through a side-edge portion thereof disposed generally opposite to said fixed-contact defining arcuate edge portion, said spindle being mounted for axial movement in accordance with the size and/or profile of a finger inserted in said hole, a movable contact having an arcuate contact surface of curvature opposite from that of said arcuate edge portion and comprising an elongate strip of flexible material secured at its approximate mid-point to the projecting end of said spindle and whose opposite end portions are curled inwardly towards one another and bear against said arcuate edge portion of the hole providing said fixed contact, whereby said inwardly curled end portions together with said arcuate edge portion coact to define a substantially circular finger-sizing opening in all axial positions of said spindle, and means carried by said body member for translating axial motion of said spindle into a visual indication of proper size of ring for said finger provided by said dial.

References Cited

UNITED STATES PATENTS

| 500,130 | 6/1893 | Hughes | 33—178 |
| 603,957 | 5/1898 | Johnson | 33—178 |
| 1,725,898 | 8/1929 | Chaperlo et al. | 33—147 |
| 2,618,070 | 11/1952 | Johnson | 33—178 |

FOREIGN PATENTS

| 2,000 | 1898 | Great Britain. |
| 240,633 | 5/1946 | Switzerland. |

HARRY N. HAROIAN, *Primary Examiner.*